(12) United States Patent
Zaid

(10) Patent No.: US 7,669,927 B1
(45) Date of Patent: Mar. 2, 2010

(54) INFANT CAR SEAT

(76) Inventor: Zakiya M. Zaid, 14302 Nags Heads Dr., Accokeek, MD (US) 20607

( * ) Notice: Subject to any disclaimer, the term of this patent is extended or adjusted under 35 U.S.C. 154(b) by 0 days.

(21) Appl. No.: 12/429,112

(22) Filed: Apr. 23, 2009

(51) Int. Cl.
*A47C 3/02* (2006.01)
*B60N 2/26* (2006.01)

(52) U.S. Cl. .................................. 297/260.2; 297/250.1

(58) Field of Classification Search ............. 297/258.1, 297/260.2, 260.1, 261.1, 261.2, 262.1, 250.1, 297/256.16, 130, 133
See application file for complete search history.

(56) References Cited

U.S. PATENT DOCUMENTS

| 139,838 | A | * | 6/1873 | Van Dervort et al. ........... 5/109 |
|---|---|---|---|---|
| 4,911,499 | A | | 3/1990 | Meeker |
| D321,449 | S | | 11/1991 | Meeker |
| 5,265,932 | A | | 11/1993 | Leonard |
| 5,348,377 | A | * | 9/1994 | Grosch ................... 297/423.45 |
| D371,248 | S | | 7/1996 | Niessen et al. |
| 5,588,164 | A | | 12/1996 | Proulx |
| 7,073,859 | B1 | | 7/2006 | Wilson |
| 2002/0113469 | A1 | | 8/2002 | Stern et al. |
| 2005/0127727 | A1 | | 6/2005 | Gangadharan et al. |
| 2005/0151401 | A1 | | 7/2005 | Evans |
| 2007/0129596 | A1 | | 6/2007 | Dickie |

* cited by examiner

*Primary Examiner*—Milton Nelson, Jr.

(57) ABSTRACT

A rocking and/or vibrating car seat for providing comfort to an infant comprising a base; a first rocker bar parallel to a second rocker bar in the inner compartment of the base extending from the first side to the second side of the base, a motor for driving the movement of the first rocker bar and second rocker bar; a cushioned seat for placing in the base atop the first rocker bar and the second rocker bar; and a vibrating unit disposed in the cushioned seat for vibrating the cushioned seat.

4 Claims, 6 Drawing Sheets

INFANT CAR SEAT

FIELD OF THE INVENTION

The present invention is directed to a car seat for an infant, more particularly to a car seat for an infant or child that vibrates and/or rocks.

BACKGROUND OF THE INVENTION

Baby carriers, car seats, and infant seat rockers are well known in the art. The present invention features an improved car seat. The car seat of the present invention vibrates and/or rocks, which can provide comfort to an infant. For example, the car seat comprises a cushioned seat that can be rocked forwardly and backwardly. In some embodiments, the cushioned seat comprises a vibrating unit for vibrating the cushioned seat.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
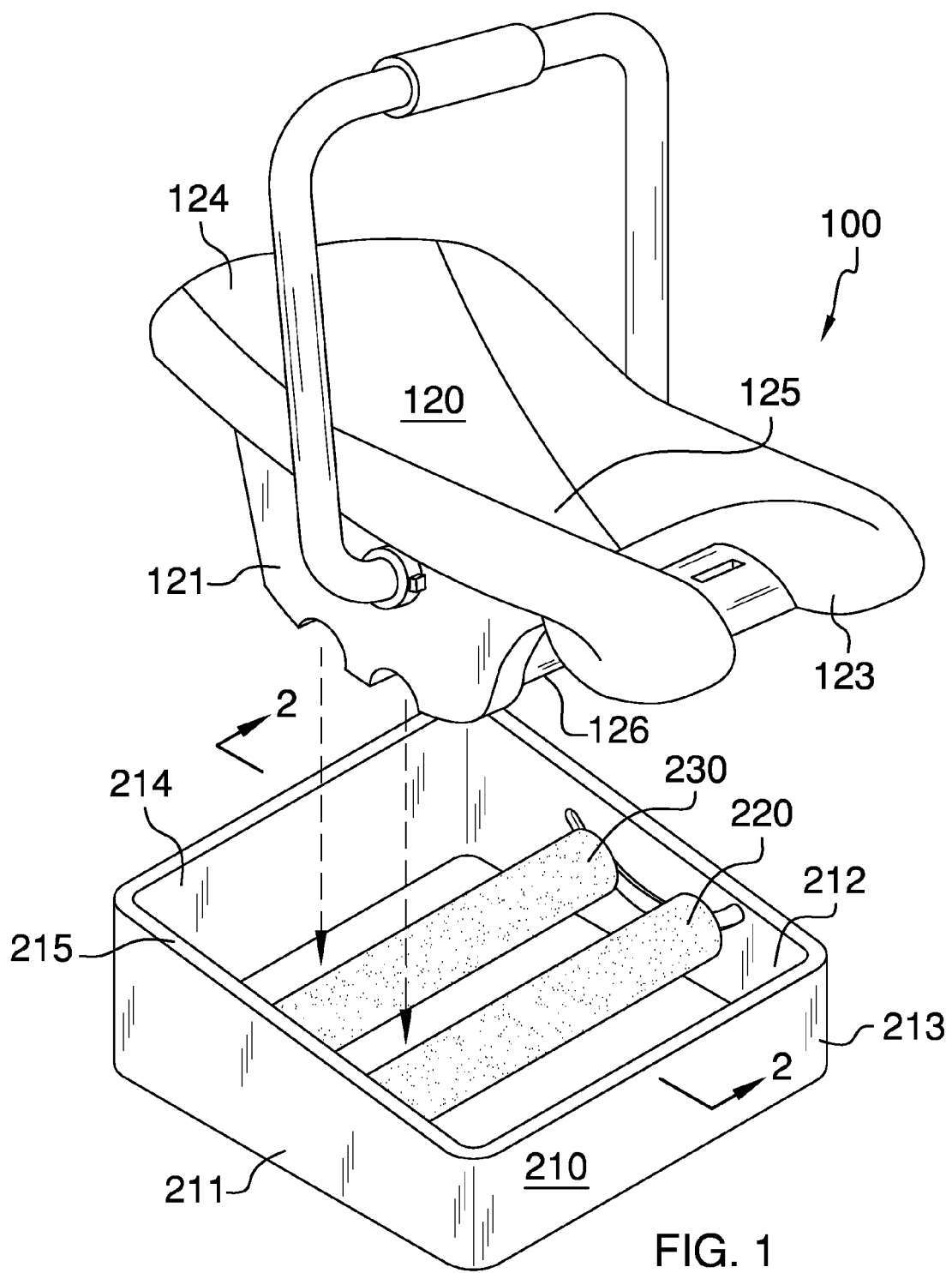
FIG. 1 is a perspective view of the car seat of the present invention.
Figure 2:
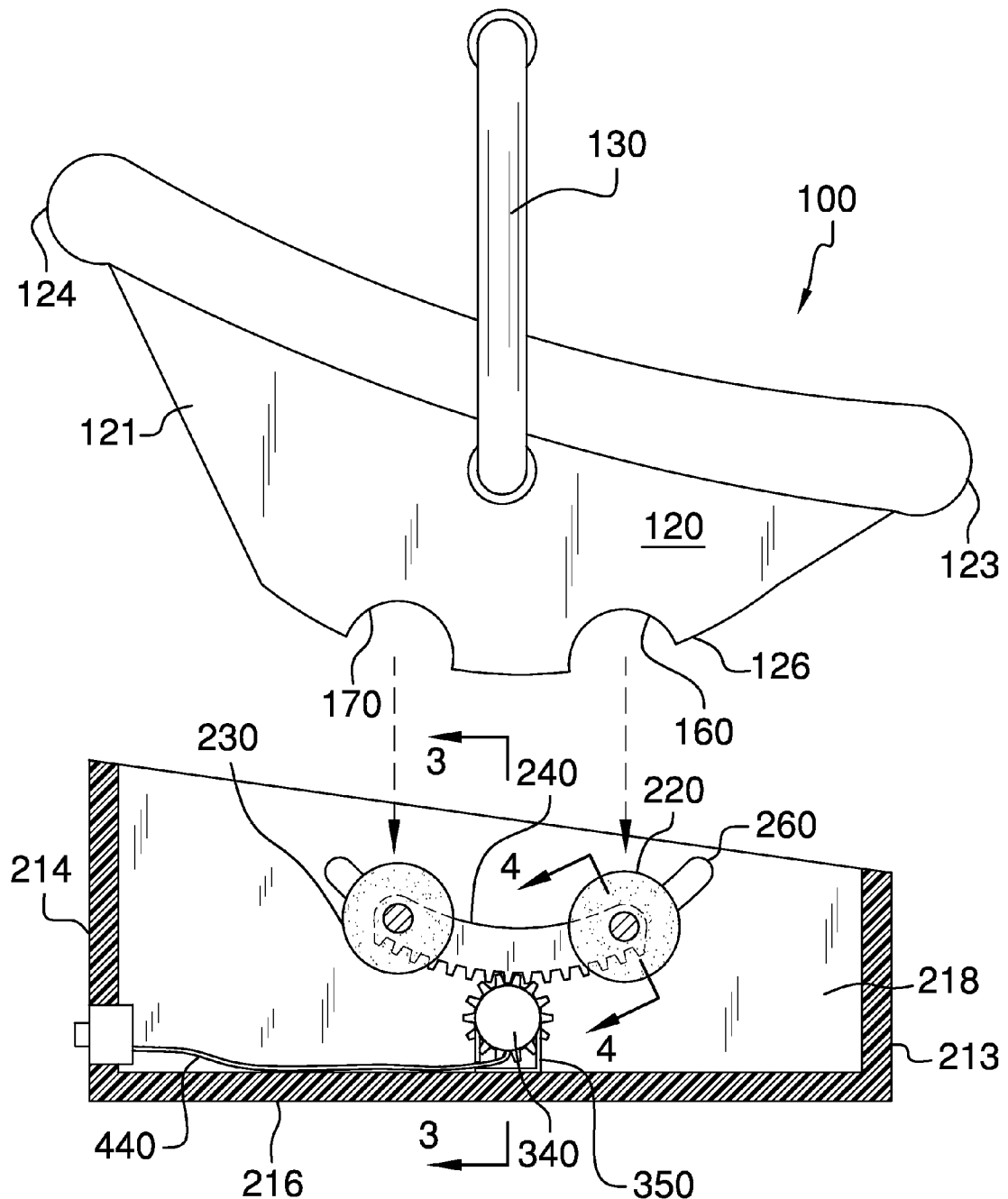
FIG. 2 is a side view and cross sectional view of the car seat of the present invention.
Figure 3:
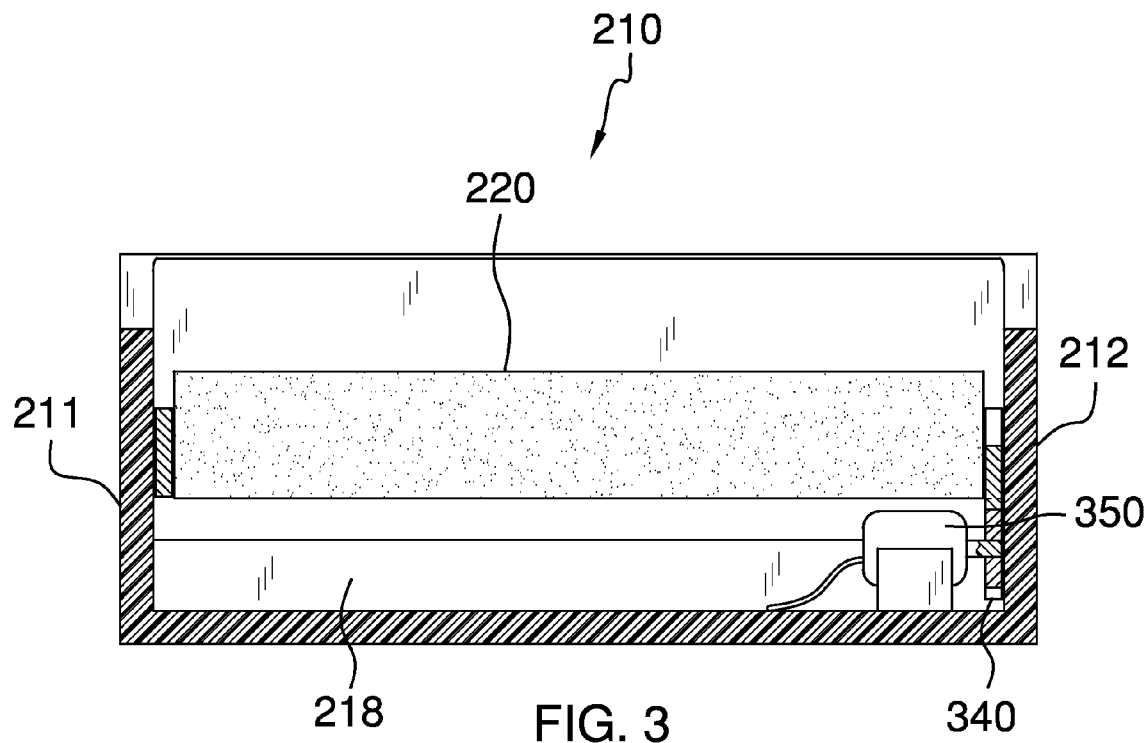
FIG. 3 is a front cross sectional view of the car seat of the present invention.
Figure 4:
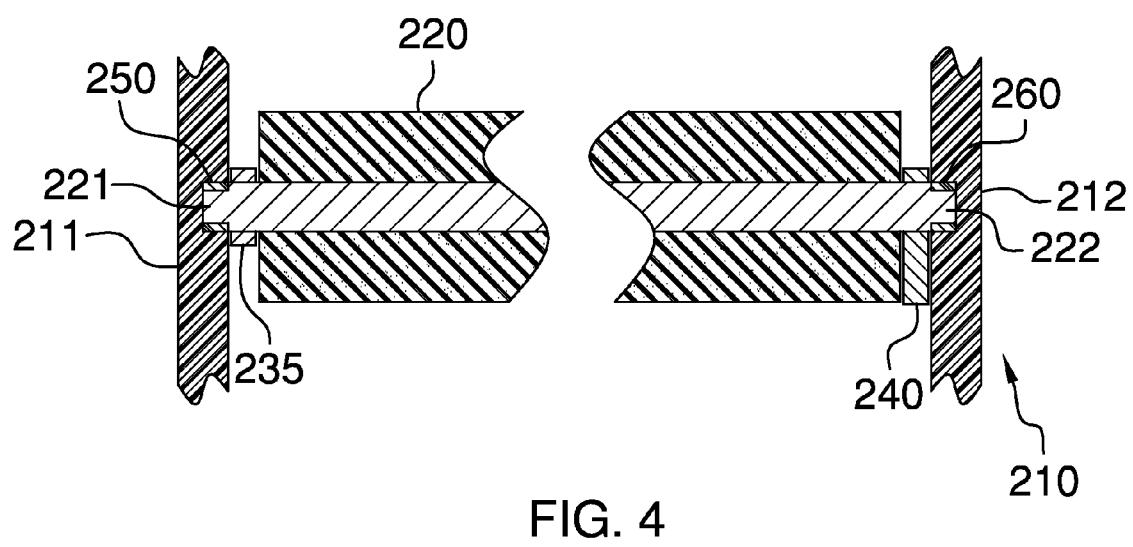
FIG. 4 is a front cross sectional view of the car seat of the present invention.
Figure 5:
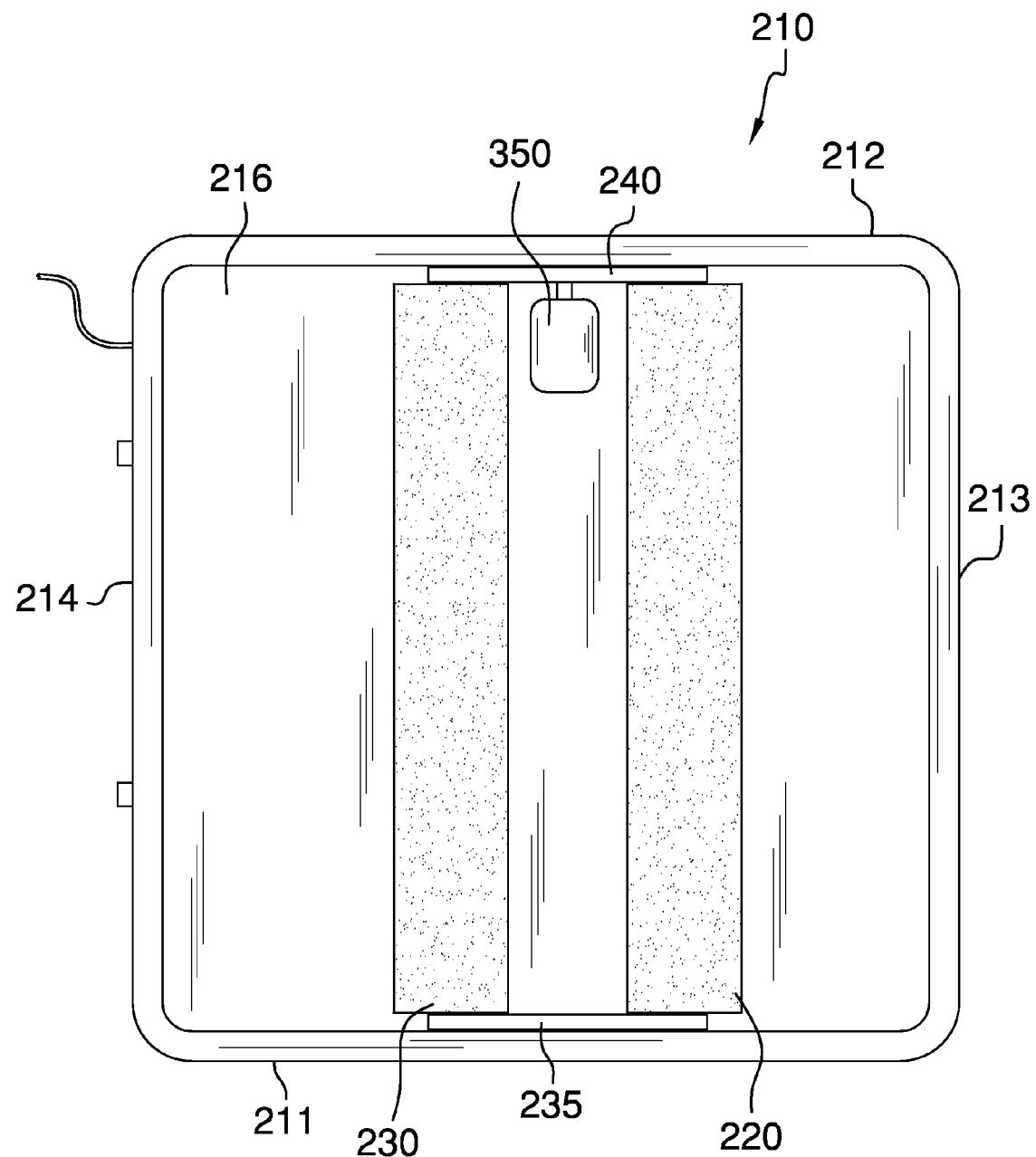
FIG. 5 is a top view of the car seat of the present invention.
Figure 6:
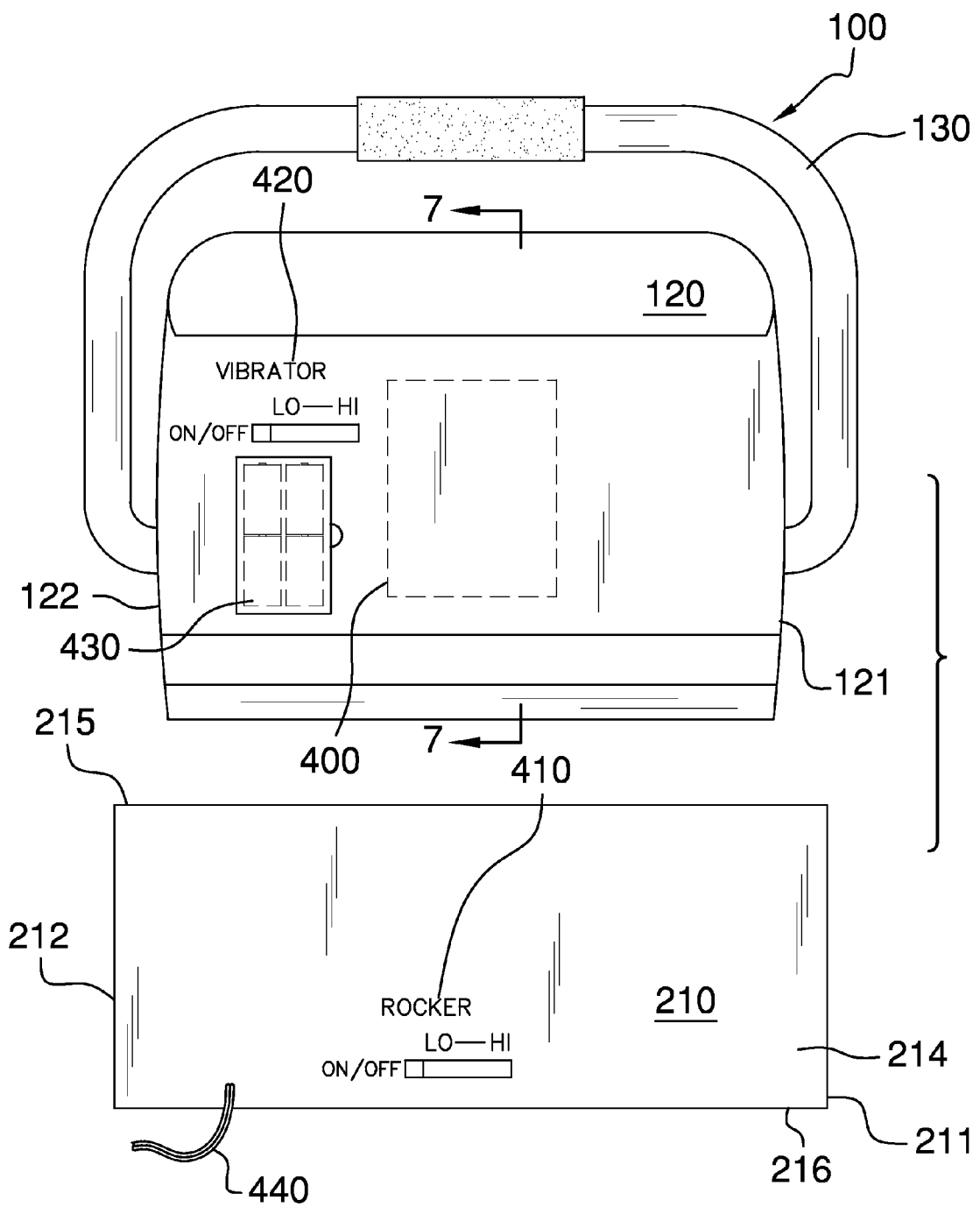
FIG. 6 is a back view of the car seat of the present invention.
Figure 7:
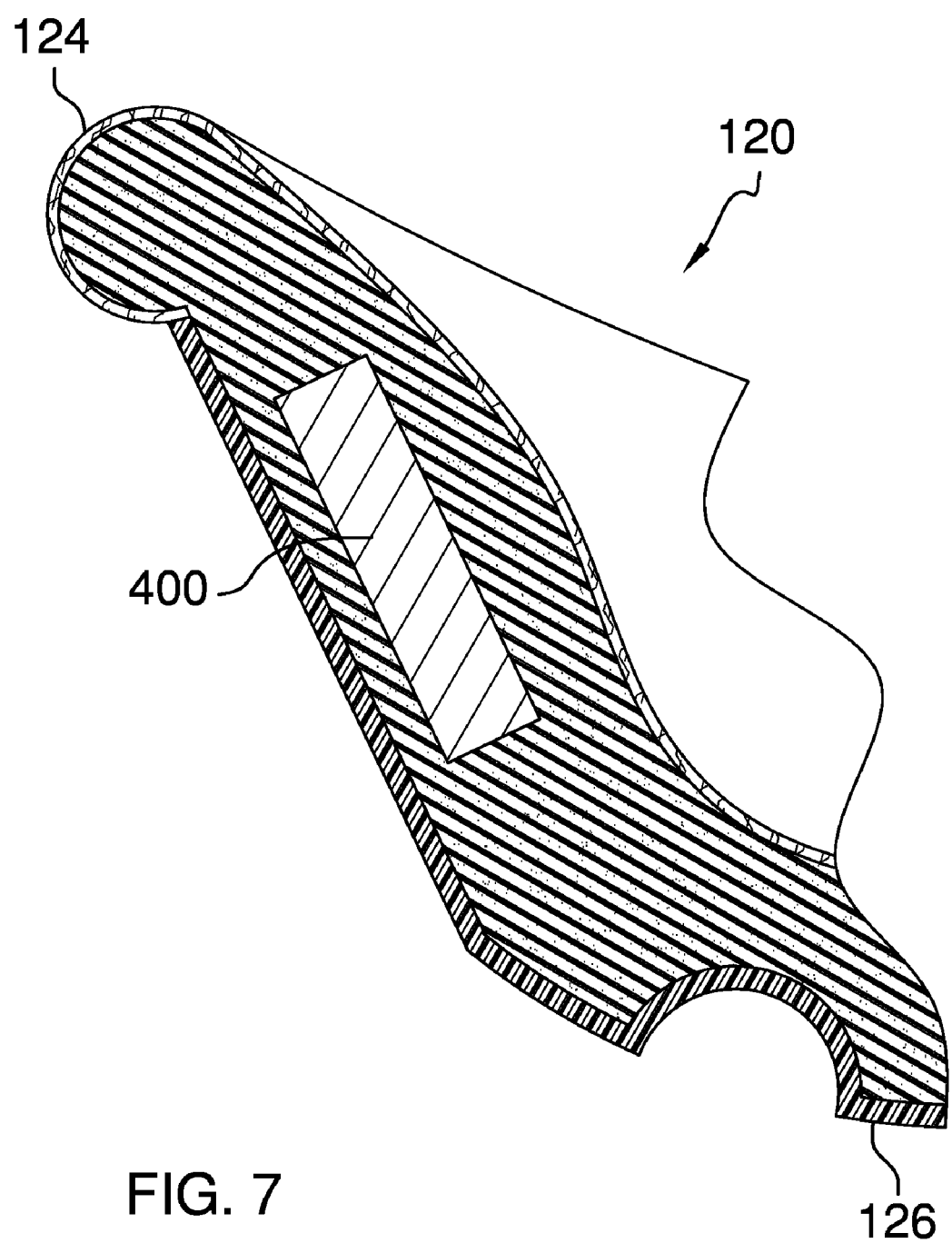
FIG. 7 is a side cross sectional view of the car seat of the present invention.

The following is a listing of numbers corresponding to a particular element refer to herein:

100 car seat
120 cushioned seat
121 first side of cushioned seat
122 second side of cushioned seat
123 front of cushioned seat
124 back of cushioned seat
125 top surface of cushioned seat
126 bottom of cushioned seat
130 handle
160 first rocker bar cavity
170 second rocker bar cavity
210 base
211 first side of base
212 second side of base
213 front of base
214 back of base
215 top edge of base
216 bottom surface of base
218 inner cavity of base
220 first rocker bar
221 first end of first rocker bar
222 second end of first rocker bar
230 second rocker bar
235 first track plate
240 second track plate
250 first track
260 second track
340 motor gear
350 motor
400 vibrating unit
410 rocking control panel
420 vibrating unit control panel
430 battery compartment
440 power cord Referring now to FIGS. 1-7, the present invention features a rocking and/or vibrating car seat 100 for providing comfort to an infant. The car seat 100 of the present invention resembles a standard car seat, well known to one of ordinary skill in the art. For example, the car seat 100 of the present invention comprises a cushioned seat 120 having first side 121, a second side 122, a front 123, a back 124, a top surface 125, and a bottom 126. The cushioned seat 120 further comprises a handle 130. In some embodiments, the handle 130 is connected to the first side 111 and second side 112 of the cushioned seat 120.

The car seat 100 of the present invention further comprises a base 210 to which the cushioned seat 120 can be attached. In some embodiments, the base 210 has a first side 211, a second side 212, a front 213, a back 214, a top edge 215, and a bottom surface 216. The base 210 comprises an inner compartment 218.

Disposed in the inner compartment 218 of the base 110 are first rocker bar 220 and a second rocker bar 230. The first rocker bar 220 has a first end 221 and a second end 222. The second rocker bar 230 has a first end and a second end. In some embodiments, the first rocker bar 220 and the second rocker bar 230 extend from the first side 211 of the base 210 to the second side 212 of the base 210. The first rocker bar 220 and second rocker bar 230 are oriented generally parallel to each other.

Disposed in the bottom 126 of the cushioned seat 120 are a first rocker bar cavity 160 and a second rocker bar cavity 170. The first rocker bar cavity 160 and the second rocker bar cavity 170 are for engaging the first rocker bar 220 and the second rocker bar 230, respectively. The rocker bars are designed to rock the cushioned seat 120.

The first rocker bar 220 and the second rocker bar 230 are spaced a distance apart via track plates. A first track plate 235 connects the first end 221 of the first rocker bar 220 and the first end of the second rocker bar 230. A second track plate 240 connects the second end 222 of the first rocker bar 220 and the second end of the second rocker bar 230.

In some embodiments, a first track 250 and a second track 260 are disposed in the first side 211 and second side 212 of the base 210, respectively. The first track 250 is for slidably engaging the first end 221 of the first rocker bar 220 and the first end of the second rocker bar 230. The second track 260 is for slidably engaging the second end 222 of the first rocker bar 220 and the second end of the second rocker bar 230. In some embodiments, the first track 250 and/or the first track plate 235 is arched, for example upwardly.

A motor 350 is disposed in the base 210. The motor 350 drives the movement of the first rocker bar 220 and second rocker bar 230.

The motor 350 comprises a motor gear 340. The motor gear 340 engages the second track plate 240, for example teeth disposed on the second track plate 240 (see FIG. 2). The motor 350 can cause the motor gear 340 to rotate in a first direction and a second direction (e.g., clockwise, counterclockwise). The rotation of the motor gear 340 in turn causes the second track plate 240 to move in a first direction or a second direction (e.g., forward, backward). As the second track 260 moves, the first rocker bar 220 and the second rocker bar 230 also move forwardly and backwardly with the second track plate 240 within the first track 250 and second track 260. In some embodiments, the second track 260 and/or the second track plate 240 is arched, for example upwardly.

In some embodiments, the motor 350 is operatively connected to a power source. In some embodiments, the power source is a battery or an electrical outlet. In some embodiments, the motor 350 is connected to the electrical outlet via a power cord 440. In some embodiments, a battery can be re-charged by plugging the power cord 440 of the car seat 100 into an electrical outlet.

The car seat 100 of the present invention further comprises a vibrating unit 400 disposed in the cushioned seat 120, for example in the back 124 of the cushioned seat 120. The vibrating unit 400 is for vibrating the cushioned seat 120. Vibrating units are well known to one of ordinary skill in the art. For example, the vibrating unit 400 of the present invention comprises a motor. In some embodiments, the motor is operatively connected to a power source (e.g., a battery). In some embodiments, a battery compartment 430 houses one or more batteries. In some embodiments, the battery can be re-charged.

In some embodiments, a vibrating unit control panel 420 for turning the vibrating unit 400 on and off is disposed on the back 124 of the cushioned seat 120. Such control panels are well known to one of ordinary skill in the art. In some embodiments, a rocking control panel 410 is disposed on the back 214 of the base 210. The rocking control panel 410 is for turning the motor 350 on and off.

In some embodiments, the vibrating unit 400 is activated via the vibrating unit control panel 420 and/or automatically (e.g., when a baby cries). In some embodiments, the rocking mechanism (e.g., motor 350) is activated via the rocking control panel 410 and/or automatically (e.g., when a baby cries).

In some embodiments, the vibrating unit 400 can be removed from the back 124 of the seat 120. The vibrating unit 400 can be used for other purposes.

In some embodiments, the car seat 100 of the present invention further comprises a sound device for providing music to the infant in the car seat 100.

The disclosures of the following U.S. Patents are incorporated in their entirety by reference herein: U.S. Pat. Application No. 2005/0151401; U.S. Pat. No. 5,265,932; U.S. Pat. Application No. 2007/0129596; U.S. Pat. No. 7,073,859; U.S. Pat. No. 5,588,164; U.S. Pat. Application No. 2005/0127727.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A car seat that can rock and vibrate for providing comfort to an infant, said car seat comprising:
 (a) a base having a first side, a second side, and an inner compartment;
 (b) a first rocker bar in the inner compartment of the base extending from the first side of the base to the second side of the base, wherein the first rocker bar has a first end and a second end;
 (c) a second rocker bar in the inner compartment of the base extending from the first side of the base to the second side of the base, wherein the second rocker bar has a first end and a second end; wherein the first rocker bar and the second rocker bar are oriented parallel with respect to each other and are spaced a distance apart via a first track plate that connects the first end of the first rocker bar and the first end of the second rocker bar, and a second track plate that connects the second end of the first rocker bar and the second end of the second rocker bar;
 (d) a cushioned seat for placing in the base atop the first rocker bar and the second rocker bar, the seat having a front, a back, a top surface, and a bottom; wherein a first rocker bar cavity and a second rocker bar cavity are disposed in the bottom for engaging the first rocker bar and the second rocker bar, respectively;
 (e) a first track disposed in the first side of the base and a second track disposed in the second side of the base, wherein the first track is for slidably engaging the first end of the first rocker bar and the first end of the second rocker bar and the second track is for slidably engaging the second end of the first rocker bar and the second end of the second rocker bar;
 (f) a motor disposed in the base for driving the movement of the first rocker bar and second rocker bar, wherein the motor comprises a motor gear which is for engaging the second track plate; wherein the motor can cause the motor gear to rotate in a first direction and a second direction, which in turn causes the second track plate to move in a first direction or a second direction, which in turn causes the first rocker bar and the second rocker bar to move forwardly and backwardly within the first track and second track;
 (g) a vibrating unit disposed in the cushioned seat for vibrating the cushioned seat; and
 (h) a power source operatively connecting to the motor.

2. The car seat of claim 1, wherein the vibrating unit comprises a motor, the motor being operatively connected to a power source.

3. The car seat of claim 1 further comprising a vibrating unit control panel for turning the vibrating unit on and off.

4. The car seat of claim 1 further comprising a rocking control panel for turning the motor on and off.

* * * * *